ic Office

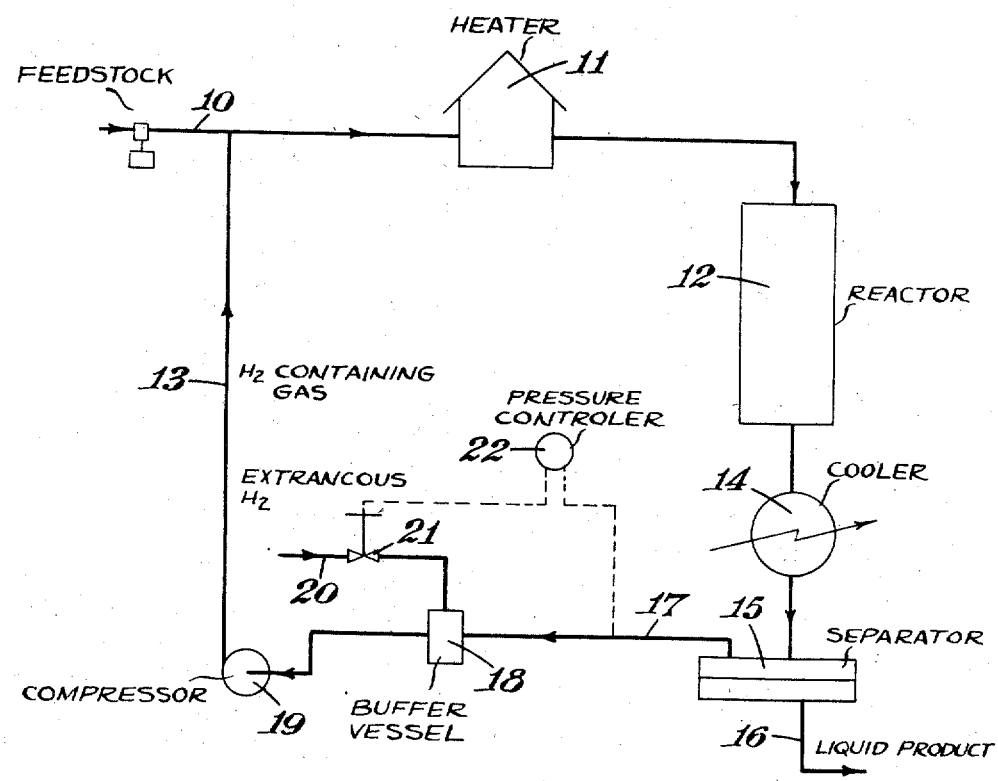

2,800,430
Patented July 23, 1957

2,800,430

HYDROCATALYTIC DESULPHURISATION OF PETROLEUM HYDROCARBONS

Frederick William Bertram Porter and Roy Purdy Northcott, Sunbury-on-Thames, England, assignors to The British Petroleum Company Limited Application November 16, 1954, Serial No. 469,278

Claims priority, application Great Britain November 24, 1953

5 Claims. (Cl. 196—28)

This invention relates to the hydrocatalytic desulphurisation of petroleum hydrocarbons.

It is well known that organically combined sulphur contained in petroleum hydrocarbons may be removed by contacting the hydrocarbons with added hydrogen at elevated temperature and pressure in the presence of a sulphur-resistant hydrogenation catalyst whereby the organically combined sulphur is converted to hydrogen sulphide which may readily be removed from the treated hydrocarbons. Such processes are commonly called hydrofining processes and are usually carried out at temperatures and pressures which are optimum for the hydrogenation reaction. Thus, pressures of the order of 1000 lb./sq. in. are employed and at such pressures there is a considerable consumption of hydrogen the cost of which is an important factor in the economics of the process.

A more recent development is the so-called autofining process wherein the petroleum hydrocarbons are contacted with a sulphur-resistant dehydrogenation-hydrogenation catalyst at a temperature and pressure such that the hydrogen required for desulphurisation is obtained by controlled dehydrogenation of the feedstock. Such a process forms the subject of United States Patents Nos. 2,573,726 and 2,574,445–51. The autofining process was originally operated at a fixed pressure and any hydrogen generated in excess of that required to maintain this fixed pressure was vented from the system. It was found, however, that increased desulphurisation was obtained by recycling all the hydrogen produced during the reaction and allowing the pressure to build up to an equilibrium pressure, and this method of operation forms the subject of United States Patent No. 2,648,623.

When autofining under equilibrium pressure conditions, the pressure rises to a maximum within a relatively short period of 5 to 25 hours, and thereafter falls gradually as the dehydrogenating activity of the catalyst decreases. The extent of the desulphurisation follows a similar pattern. The length of the run, i. e. the hours on stream before regeneration, is therefore governed by the rate at which the desulphurisation falls. For example, with a gas oil feedstock of 1.3% by weight sulphur when operating at 2.0 v./v./hr. a bulked sulphur of 0.1% by weight is obtained over 200 hours on stream although by the end of this period the residual sulphur content is in the region of 0.3 to 0.4% by weight.

It has now been found that increased hours on stream may be obtained by maintaining the autofining equilibrium pressure by means of hydrogen added from an extraneous source, with considerably less consumption of hydrogen than occurs in conventional hydrofining processes.

According to the present invention, therefore, a process for the hydrocatalytic desulphurisation of petroleum hydrocarbons, comprises contacting the hydrocarbons with a sulphur-resistant dehydrogenation-hydrogenation catalyst under autofining conditions of temperature and space velocity and recycling the hydrogen-rich gas separated from the treated hydrocarbons until the pressure in the reaction zone reaches equilibrium and thereafter maintaining the equilibrium pressure prevailing at any particular time by means of hydrogen or hydrogen-rich gas added from an external source.

By operating in this manner, the fall-off of the dehydrogenating activity of the catalyst is retarded and the hours on stream before regeneration are considerably lengthened. Although under these conditions the process is now a nett consumer of hydrogen, it shows considerable economic advantage in that the overall hydrogen consumption for a given sulphur removal is reduced to only a fraction of that obtained when carrying out a hydrofining operation at the conventional higher pressures.

The temperature and space velocity required for any particular feedstock can easily be determined by experiment but in general the following ranges of conditions apply:

Temperature _____ °F__ 750–800
Space velocity _____v./v./hr__ 1–5

The equilibrium pressure obtained with any particular feedstock depends upon the particular catalyst employed, the temperature and the space velocity. A particularly effective catalyst consists of the oxides of cobalt and molybdenum incorporated with or deposited on alumina. Improved results are obtained if the catalyst contains fluorine which is advantageously present in an amount between 1 and 4% by weight of the catalyst, since it has been found that the presence of the fluorine increases the dehydrogenating activity of the catalyst and thereby enables higher equilibrium pressures to be built up resulting in increased desulphurisation. Methods of preparing cobalt oxide-molybdenum oxide catalyst containing fluorine are described in the specification of United States application No. 311,429, filed September 25, 1952.

In carrying the invention into effect, a hydrogen-rich gas may be passed to the reaction zone to maintain the maximum equilibrium pressure obtained on autofining and if a hydrogen-rich gas is available at a pressure below said maximum equilibrium pressure, it may be compressed to the desired pressure. In some cases, however, it may be preferred to utilise the hydrogen-rich gas without compression, in which case it is passed to the autofining zone when the equilibrium pressure has fallen to the pressure of the hydrogen-rich gas.

The extraneous hydrogen required to maintain the equilibrium pressure may conveniently be obtained from catalytic reforming processes or may be manufactured from refinery gases by known methods.

The process according to the invention may be carried out in a plant as shown in the accompanying diagram.

The feed stock enters via line 10 and passes through a heater 11 to a reactor 12 in admixture with hydrogen from line 13. The products from reactor 12 pass through cooler 14 without substantial reduction of pressure to a separator 15 from which a liquid product is withdrawn via line 16, the liquid product containing dissolved therein the hydrogen sulphide formed during the reaction in reactor 12. The liquid product is passed to a stabiliser for the removal of the hydrogen sulphide and light hydrocarbon gases. The gaseous product from the separator 15, consisting largely of hydrogen, is passed via line 17, buffer vessel 18, compressor 19 and line 13 into admixture with the incoming feedstock. Hydrogen from an extraneous source, such as catalytic reformer exit gas, is admitted via line 20 and valve 21, the admission of such extraneous hydrogen being controlled by the pressure controller 22 to maintain the pressure in line 17 at the equilibrium pressure set up within the system.

The invention will now be described by way of example as applied to the desulphurisation of a Kuwait straight-run gas oil containing 1.3% wt. sulphur.

Example 1

The following Table 1 compares the results obtained when operating in accordance with the present invention to give a product of 0.1% wt. sulphur using catalytic reformer gases containing ca. 70% mol. hydrogen to maintain the maximum autofining equilibrium pressure, with those obtained under conventional hydrofining conditions.

TABLE 1

| | Using Catalytic reformer gases to maintain the maximum auto-fining pressure | Conventional hydrofining | | | |
|---|---|---|---|---|---|
| Catalyst | F activated Co-Mo oxides on alumina. | Co-Mo oxides on alumina. | Co-Mo oxides on alumina. | Co-Mo oxides on alumina. | F activated Co-Mo oxides on alumina. |
| Pressure, p. s. i. ga | 320 (after 25 hrs. on stream). | 500 | 500 | 1,000 | 500. |
| Temperature, °F | 780 | 800 | 780 | 780 | 780. |
| Space Velocity, v./v./hr | 2 | 2 | 4 | 8 | 4. |
| Recycle Rate, S. C. F./B | 2,000 (set at 100 p.s.i. ga.). | 4,000 | 4,000 | 4,000 | 4,000. |
| Hydrogen Consumption, S. C. F./B | 30 | 103 | 104 | 155 | 93 |

It will be seen that the hydrogen consumption for the same sulphur removal is considerably less when operating in accordance with the invention.

Example 2

The following Table 2 compares the effect of hours on stream on residual sulphur content when (a) autofining under equilibrium pressure conditions, and (b) maintaining the maximum autofining equilibrium pressure by adding catalytic reformer gas (ca. 70% $H_2$).

TABLE 2

| | Autofining | | | | Maintaining max. equilibrium pressure with cat. reformer gases | | | |
|---|---|---|---|---|---|---|---|---|
| Catalyst | F activated Co-Mo oxides on alumina. | | | | F activated Co-Mo oxides on alumina. | | | |
| Temperature, °F | 780 | | | | 780. | | | |
| Space Velocity, v./v./hr | 2 | | | | 2. | | | |
| Recycle rate, S. C. F./B | 2,000 (set at 100 p. s. i. ga.). | | | | 2,000 (set at 100 p. s. i. ga.). | | | |
| Initial pressure, p. s. i. ga | 100 | | | | 100. | | | |
| Hours on stream | 10 | 50 | 100 | 150 | 10 | 50 | 100 | 150 |
| Pressure, p. s. i. ga | 285 | 265 | 220 | 125 | 285 | 320 | 320 | 320 |
| Residual sulphur, percent wt | 0.04 | 0.09 | 0.19 | 0.54 | 0.07 | 0.08 | 0.12 | 0.13 |

It will be seen that the hours on stream for a given residual sulphur content are considerably greater in case (b).

We claim:

1. A process for the hydrocatalytic desulphurisation of petroleum hydrocarbons, which comprises contacting the hydrocarbons with a sulphur-resistant dehydrogenation-hydrogenation catalyst under autofining conditions of temperature and space velocity and recylining the hydrogen-rich gas separated from the treated hydrocarbons until the pressure in the reaction zone reaches a pressure which is approximately equal to the autofining equilibrium pressure of the feedstock under the conditions of catalyst, temperature, and space velocity, and thereafter adding hydrogen or hydrogen-rich gas from an external source at a rate to maintain an equilibrium pressure value at a substantially constant level.

2. A process according to claim 1, wherein the equilibrium pressure is maintained by means of the hydrogen-rich gases obtained from a catalytic reforming process.

3. A process according to claim 1, which is carried out at a temperature of 750–800° F. and at a space velocity of the liquid feedstock of 1 to 5 v./v./hr.

4. A process according to claim 1, wherein said catalyst essentially consists of the oxides of cobalt and molybdenum supported on alumina and contains from 1 to 4% by weight of fluorine.

5. A process according to claim 1, wherein said petroleum feedstock is a gas oil.

References Cited in the file of this patent

UNITED STATES PATENTS

| 2,498,559 | Layng et al. | Feb. 21, 1950 |
| 2,577,823 | Stine | Dec. 11, 1951 |
| 2,648,623 | Porter et al. | Aug. 11, 1953 |
| 2,658,028 | Hansel et al. | Nov. 3, 1953 |
| 2,697,683 | Engel et al. | Dec. 21, 1954 |

OTHER REFERENCES

Hoog et al.: Oil & Gas Journal, vol. 52, No. 5, pages 92 and 94 to 96 (June 8, 1953).

U. S. DEPARTMENT OF COMMERCE
PATENT OFFICE

CERTIFICATE OF CORRECTION

Patent No. 2,800,430                                    July 23, 1957

Frederick William Bertram Porter et al.

It is hereby certified that error appears in the printed specification of the above numbered patent requiring correction and that the said Letters Patent should read as corrected below.

Column 3, line 64, for "recylining" read -- recycling --.

Signed and sealed this 25th day of March 1958.

(SEAL)
Attest:
KARL H. AXLINE
Attesting Officer

ROBERT C. WATSON
Commissioner of Patents